United States Patent
Clements

(10) Patent No.: US 6,358,292 B1
(45) Date of Patent: Mar. 19, 2002

(54) PLEATED FILTER ELEMENT WITH REUSABLE MOUNTING PLATE

(75) Inventor: Jack T. Clements, Lee's Summit, MO (US)

(73) Assignee: BHA Group Holdings, Inc., Kansas City, MO (US)

( * ) Notice: Subject to any disclaimer, the term of this patent is extended or adjusted under 35 U.S.C. 154(b) by 0 days.

(21) Appl. No.: 09/586,521

(22) Filed: Jun. 2, 2000

(51) Int. Cl.$^7$ ................................................ B01D 46/02
(52) U.S. Cl. ............................ 55/498; 55/174; 55/379; 55/492; 55/501; 55/505; 55/DIG. 26
(58) Field of Search .......................... 55/302, 374, 379, 55/492, 498, 499, 501, 502, 505, DIG. 26

(56) References Cited

U.S. PATENT DOCUMENTS

| 1,847,368 A | 3/1932 | Wendler |
| 2,308,309 A | 1/1943 | Reumelin et al. |
| 2,335,315 A | 11/1943 | Seymour |
| 2,503,568 A | 4/1950 | Timm |

(List continued on next page.)

FOREIGN PATENT DOCUMENTS

| EP | 0 520 737 | 12/1982 |
| EP | 0 160 168 | 11/1985 |
| EP | 0 213 930 | 3/1987 |
| GB | 242388 | 11/1925 |
| GB | 636439 | 4/1950 |
| GB | 840570 | 7/1960 |
| GB | 990587 | 4/1965 |
| GB | 1016556 | 1/1966 |
| GB | 1081516 | 8/1967 |
| GB | 2195558 A | 4/1988 |
| WO | WO 85/05286 | 12/1985 |

Primary Examiner—David A. Simmons
Assistant Examiner—Minh-Chan T. Pham
(74) Attorney, Agent, or Firm—Shook, Hardy & Bacon

(57) ABSTRACT

A filter cartridge for use in a filter apparatus having a tube sheet is provided. The filter cartridge has a tubular filter with opposite ends, a mounting cap and a mounting plate. The mounting cap is secured to one end of the tubular filter and has a first surface and a ledge extending from the tubular filter. The mounting plate has an opening sized for receipt of the tubular filter. The ledge of the mounting cap overlies the mounting plate when the tubular filter is received within the opening, and, the mounting cap is supported by the mounting plate to enable the first surface to engage the tube sheet when the filter apparatus in operation.

18 Claims, 2 Drawing Sheets

U.S. PATENT DOCUMENTS

| | | | |
|---|---|---|---|
| 2,927,659 | A | 3/1960 | Pabst et al. |
| 2,952,332 | A | 9/1960 | Metro |
| 2,981,368 | A | 4/1961 | Johnson |
| 3,167,415 | A | 1/1965 | Edwards |
| 3,170,777 | A * | 2/1965 | Held ............................ 55/379 |
| 3,421,295 | A | 1/1969 | Swift et al. |
| 3,524,304 | A | 8/1970 | Wittemeier et al. |
| 3,550,359 | A | 12/1970 | Fisher et al. |
| 3,716,436 | A | 2/1973 | Pall et al. |
| 3,747,305 | A | 7/1973 | O'Dell et al. |
| 3,765,152 | A | 10/1973 | Pausch |
| 3,791,111 | A | 2/1974 | Kroll |
| 3,826,066 | A | 7/1974 | Higgins |
| 3,830,042 | A | 8/1974 | MacDonnell |
| 3,837,151 | A | 9/1974 | Jensen |
| 3,853,509 | A | 12/1974 | Leliaert |
| 3,876,402 | A | 4/1975 | Bundy et al. |
| 3,942,962 | A | 3/1976 | Duyckinck |
| 3,997,305 | A | 12/1976 | Ulvestad et al. |
| 4,073,632 | A | 2/1978 | Reinauer et al. |
| 4,138,234 | A * | 2/1979 | Kubesa ......................... 55/379 |
| 4,187,091 | A | 2/1980 | Durre et al. |
| 4,218,227 | A | 8/1980 | Frey |
| 4,247,314 | A | 1/1981 | Smoluchowski et al. |
| 4,256,473 | A | 3/1981 | De Martino |
| 4,270,935 | A | 6/1981 | Reinauer |
| 4,276,069 | A | 6/1981 | Miller |
| 4,291,904 | A | 9/1981 | Iversen et al. |
| 4,292,057 | A | 9/1981 | Ulvestad et al. |
| 4,293,111 | A * | 10/1981 | Henri ........................... 55/379 |
| 4,319,897 | A | 3/1982 | Labadie |
| 4,322,231 | A | 3/1982 | Hilzendeger et al. |
| 4,344,781 | A | 8/1982 | Higgins et al. |
| 4,424,070 | A | 1/1984 | Robinson |
| 4,436,536 | A | 3/1984 | Robinson |
| 4,443,237 | A | 4/1984 | Ulvestad |
| 4,445,915 | A | 5/1984 | Robinson |
| 4,560,477 | A | 12/1985 | Moldow |
| 4,632,680 | A | 12/1986 | Klimczak |
| 4,663,041 | A | 5/1987 | Miyagi et al. |
| 4,732,678 | A | 3/1988 | Humbert, Jr. |
| 4,878,930 | A | 11/1989 | Manniso et al. |
| 4,929,354 | A | 5/1990 | Meyering et al. |
| 4,954,255 | A | 9/1990 | Müller et al. |
| 5,061,303 | A * | 10/1991 | Williams et al. ............... 55/379 |
| 5,074,896 | A | 12/1991 | Baert et al. |
| 5,173,098 | A | 12/1992 | Pipkorn |
| 5,207,811 | A | 5/1993 | Buonpastore |
| 5,207,812 | A | 5/1993 | Tronto et al. |
| 5,211,846 | A | 5/1993 | Kott et al. |
| 5,222,488 | A | 6/1993 | Forsgren |
| 5,290,441 | A | 3/1994 | Griffin et al. |
| 5,290,446 | A | 3/1994 | Degen et al. |
| 5,308,369 | A | 5/1994 | Morton et al. |
| 5,336,405 | A | 8/1994 | Tang et al. |
| 5,964,909 | A * | 10/1999 | Brunner ....................... 55/379 |
| 6,179,888 | B1 * | 1/2001 | Mangaforte .................. 55/379 |

* cited by examiner

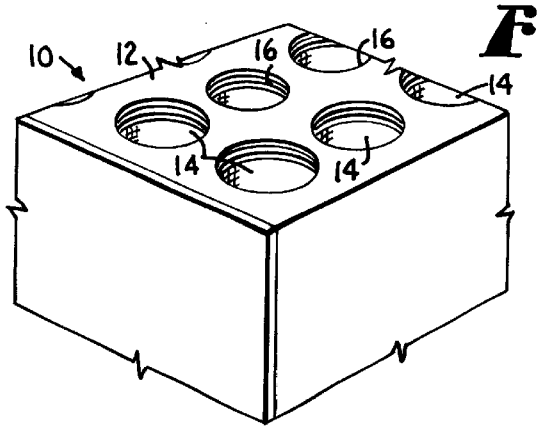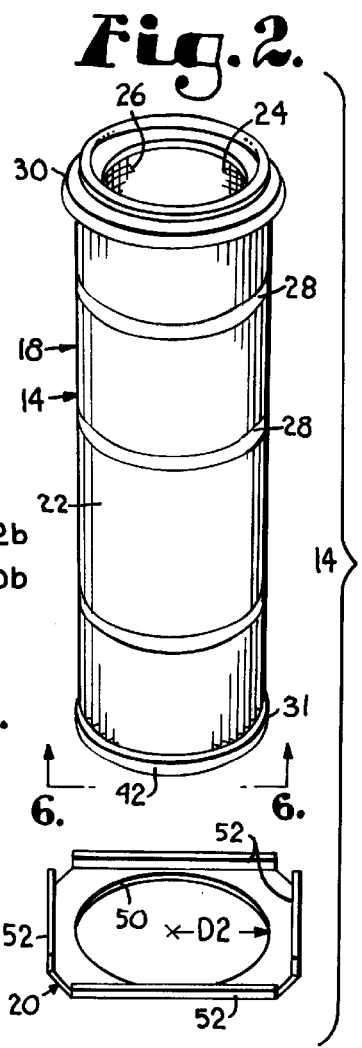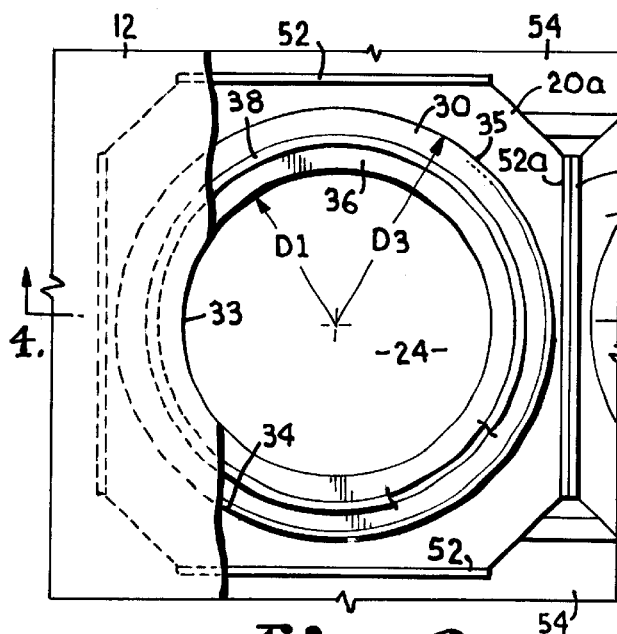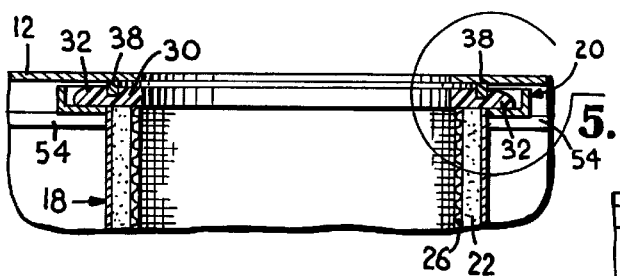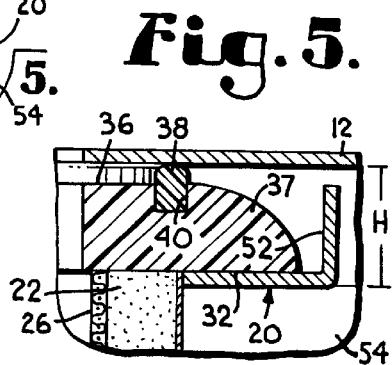

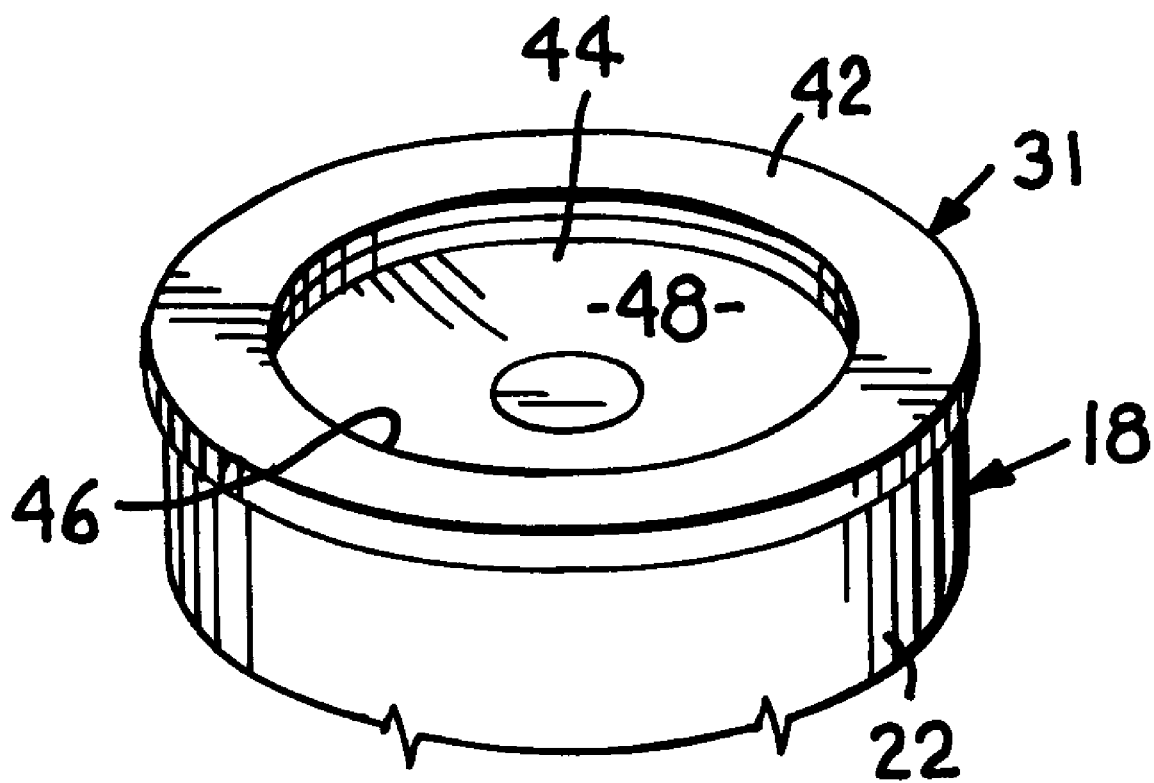

PLEATED FILTER ELEMENT WITH REUSABLE MOUNTING PLATE

CROSS-REFERENCE

"Not Applicable"

STATEMENT REGARDING FEDERALLY SPONSORED RESEARCH AND DEVELOPMENT

"Not Applicable"

BACKGROUND OF THE INVENTION

The present invention generally relates to filters within a baghouse or dust collector and more particularly to an air filter cartridge having a reusable mounting plate for securing the filter within the baghouse.

Filter apparatus, such as baghouses, are commonly used for removing particulates and aerosols from the air in industrial environments. Baghouses typically include two large chambers, or plenums, that are divided by a tube sheet. The filter cartridges, preferably containing fabric filtration elements, are secured to the tube sheet at one end to suspend the cartridge within the lower plenum. Fabric filter media having longitudinal pleatings are particularly effective for removing particulates. One such air filter cartridge is disclosed in U.S. Pat. No. 5,632,791.

Air containing particulates is forced into the first plenum by a forced air means such as a fan. The air passes from the first plenum to the second plenum via the air filter cartridges held by the tube (or pan) sheet. The particulates are retained on the outer surface of the fabric filter element of the cartridge filter, and the clean air is directed into the second plenum and exits the baghouse through an exhaust passageway.

Oftentimes, the baghouses are operated continuously for relatively long periods of time. As with most physical filtration media, the effectiveness of the filter media diminishes as particulates collect on the outer surfaces of the filter elements and restrict the airflow through the filters. To remove accumulation of particulate on the baghouse filters, air may be pulsed through the baghouse cartridge filters from the second plenum to the first plenum. The air pulses dislodge the particulates embedded on the exterior surface of the filter, and the loose particulates are removed from the first plenum. Accordingly, the effectiveness of the baghouse is greatly increased without having to frequently remove and replace the cartridges. One such apparatus for cleaning baghouse filters is disclosed in U.S. Pat. No. 5,837,017.

While the cleaning process significantly increases the life span of the filter elements, the filter cartridges must be replaced periodically. Accordingly, a number of systems have been used to releasably secure the filter cartridges in sealing engagement with the tube sheet. One such mechanism, disclosed in U.S. Pat. No. 4,322,231, utilizes a pair of longitudinal bars underlying the tube sheet. A metal mounting plate is integrally formed with the upper end of each filter cartridge. The mounting plate is slid along the bars and suspended therefrom. When the filter cartridges are in the proper position on the longitudinal bars, the bars are rotated so that a curvilinear surface on each bar forces the mounting plates into sealing engagement with the pan sheet. A gasket on each filter cartridge seals the cartridges to the pan sheet when the cartridges are locked in the operational position within the baghouse.

However, the cartridge filters used within this mounting system are costly to manufacture, in part, due to the costs of the raw materials that are discarded when the cartridges no longer effectively remove particulates from the air. Moreover, it is difficult and costly to form the mounting plate integrally with the filter cartridge, and is particularly difficult to manufacture an integral mounting plate sized to fit between the locking mechanism and tube sheet.

SUMMARY OF THE INVENTION

It is an object of the present invention to provide an air filter cartridge having a mounting plate to removably mount a filter cartridge in a baghouse.

In accordance with the foregoing and other objects evident from the following description of a preferred embodiment of the invention, a filter cartridge for use in a baghouse having a tube sheet is provided. The filter cartridge includes a tubular filter having opposite ends, a mounting cap and a reusable mounting plate. The mounting cap is secured to one end of the tubular filter and has a first surface and a ledge extending from the tubular filter. The mounting plate has an opening sized for receipt of the tubular filter. The ledge of the mounting cap overlies the mounting plate when the tubular filter is received within the opening, and the mounting cap is supported by the mounting plate to enable the first surface to engage the tube sheet when the baghouse is in operation.

In another aspect, a filter cartridge for use in a baghouse having a tube sheet and a locking mechanism is provided. The filter cartridge has a tubular filter with opposite ends, a mounting cap and a mounting plate. The mounting cap is secured to one end of the tubular filter and has a first surface and a ledge extending from the tubular filter. The mounting plate has an opening sized for receipt of the tubular filter. The ledge of the mounting cap overlies the mounting plate when the tubular filter is received within the opening. Thus, the mounting cap is supported by the mounting to enable the first surface to engage the tube sheet when the locking mechanism moves the mounting plate in a direction towards the tube sheet and the baghouse is in operation.

In yet another aspect of the present invention, a method for securing a filter cartridge in a filter apparatus (such as a baghouse) is provided. The method includes providing a reusable mounting plate having an opening, placing the filter cartridge within the opening of the plate and releasably securing the mounting plate to a tube sheet within the baghouse.

By providing an air filter cartridge in accordance with the present invention, numerous advantages are achieved. For instance, the mounting plate may be re-used with the replacement filter cartridges as the prior cartridges lose their utility. Also, the unique filter cartridge provides a compact and effective design wherein the combined height of the mounting cap and mounting plate is relatively thin. Moreover, the cost of production of the device of the present invention is significantly lower than filter cartridges having integral mounting plates of the prior art.

BRIEF DESCRIPTION OF SEVERAL VIEWS OF THE DRAWINGS

FIG. 1 is a perspective view of the interior of a portion of a filter apparatus utilizing cartridge filters according to the present invention;

FIG. 2 is an exploded perspective view of a filter cartridge according to the invention;

FIG. 3 is a top plan view of a portion of the filter apparatus of FIG. 1 and a filter cartridge with portions removed to better illustrate the relationship between the air filter cartridge and filter apparatus;

FIG. 4 is a cross sectional view of the filter apparatus taken generally along line 4—4 of FIG. 3;

FIG. 5 is an enlarged fragmentary view of a portion of the filter apparatus generally denoted by numeral 5 in FIG. 4; and FIG. 6 is a partial bottom perspective view of the filter cartridge of FIG. 2.

DETAILED DESCRIPTION OF THE INVENTION

With initial reference to FIG. 1, a portion of a filter apparatus (or baghouse) utilizing filter cartridges made in accordance with the present invention is designated generally by the reference numeral 10. The filter apparatus 10 includes a tube sheet 12 and a plurality of filter cartridges 14. Typically, tube sheet 12 separates a clean air plenum above the tube sheet from a dirty air plenum located below the sheet. Tube sheet 12 includes a plurality of openings 16 typically arranged in an array. The filter cartridges 14 are held on the underside of tube sheet 12 in communication with openings 16. When the filter apparatus 10 is in operation, air is forced through the filter cartridges 14 to remove particulate material previously suspended in the air flowing from the dirty air plenum to the clean air plenum.

With reference to FIG. 2, each filter cartridge 14 includes a unitary filter element 18 and a reusable mounting plate 20. Filter element 18 includes a tubular filter 22 secured between a mounting cap 30 and an end cap 31. Tubular filter 22 (also referred to as a pleat pack, filter media, or filter sheet) is formed of a pleated filtration media arranged in a generally cylindrical shape defining a central chamber 24. The surface of tubular filter 22 may include dimples (not shown) to prevent engagement of one pleat to the adjacent pleat. The tubular filter 22 is formed about, and abuts against, a tubular support screen 26. Preferably, screen 26 is made from of a light metal, but may also be manufactured from a group of other materials typically used for screens such as plastic. A plurality of straps 28 are secured about the outer circumference of the filter sheet 22. These straps 28 are preferably formed from a woven synthetic material such as plastic or a similar material having a relatively high tensile strength. The straps 28 are permanently positioned about the circumference of tubular filter 22 by securing the ends of each strap to one another and adhering the straps to the filtration media with a hot melted adhesive. The straps 28 ensure the dimensional stability of the tubular filter 22, particularly when air is pulsed from the central chamber 24 through the tubular filter and outwardly into the dirty air plenum during the filter cartridge cleaning process.

With reference to FIGS. 2 and 3, mounting cap 30 is located at one end of tubular filter 22. The annular mounting cap 30 has an inner edge 33 (FIG. 3) and an outer edge 35. The diameter D1 at inner edge 33 is somewhat smaller than the inner diameter of tubular filter 22. In the preferred embodiment, the mounting cap 30 extends radially outwardly from the circumference of the tubular filter 22 and includes a downwardly facing ledge 32 (as viewed in FIGS. 4 and 5). Ledge 32 and the opposing, uppermost surface 36 of mounting cap 30 are generally planar. An arcuate surface 37 (FIG. 5) extends between ledge 32 and surface 36. Preferably, mounting cap 30 is made from a potting compound such as a cast, molded or extruded polymer. As is well understood in the art, the potting compound is heated within a mold defining the shape of the mounting cap 30. The edge of tubular filter 22 and the upper edge of support screen 26 are placed in the mold in the potting compound. The potting compound cures to shape and encases the tubular filter 22 and support screen 26.

A gasket 38 is located in an annular channel 40 formed in the surface 36 of mounting cap 30. Preferably, as best shown in FIG. 5, an annular channel 40 has a generally rectangular cross-section in upper surface 36. In the preferred embodiment, the channel 40 locates and supports the gasket 38 so it extends axially away from surface 36 of the mounting cap 30. An adhesive such as a high strength glue is placed within channel 40 and the prefabricated gasket 38 is placed therein. In the preferred embodiment, the gasket 38 is made of a foam material.

Alternatively, if a channel is not utilized to locate the gasket 38, the gasket may be applied by foaming the gasket in place onto surface 36. In another alternative, the upper surface 36 would include a male protrusion that is matingly received in a groove formed within a prefabricated gasket 38 to secure the gasket to upper surface 36. In these alternative embodiments, a urethane gasket is secured to mounting cap 30 by a contact cement or similar adhesive and treated by a sulfur or peroxide curing process.

With reference to FIGS. 2 and 6, end cap 31 has an annular ring 42 and a steel dome 44 that enclose the bottom of tubular filter 22. The steel dome 44 has a generally cylindrical portion 46 and a dome section 48. Like the mounting cap 30, the annular ring 42 is preferably made from a suitable potting compound such as a cast, molded or extruded polymer. The tubular filter 22 and steel dome 44 are placed within a mold and secured to end cap 31 by casting the potting compound around the components. Specifically, the steel dome 44 is embedded near the inner diameter of the annular ring 42 by placing the cylindrical portion 46 into the mold for forming the annular ring. The dome 44 may include a flange (not shown) formed normally to the cylindrical portion 46 to facilitate a firm connection between dome and bottom cap 31.

With reference to FIG. 2, reusable mounting plate 20 is generally rectangular and has an opening 50. The mounting plate 20 is preferably made from a sheet metal, such as steel. In the preferred embodiment, the corners of the mounting plate are removed and the sides of the plate (FIG. 2 and 3) turned upwardly at right angles to form a plurality of upstanding flanges 52. The diameter D2 of opening 50 (FIG. 2) is somewhat greater than the diameter of the openings 16 of the tube sheet 12 and less than the diameter D3 of upper ledge 32 at outer edge 35 (FIG. 3). Opposite flanges 52 of the mounting plate 20 are spaced apart a distance greater than the diameter D3 of the ledge 32 of mounting cap 30. The combined height H of the mounting plate 20 and mounting cap 30 is less than the space between a known support structure in a "closed" position and the tube sheet 12 of the filter apparatus 10.

In the preferred embodiment shown in FIGS. 3 and 4, a support structure is shown as a pair of longitudinal locking bars 54. Generally, the locking bars 54 underlie tube sheet 12 and are movable from a first position at a distance from the tube sheet and a second position relatively closer to the tube sheet. For example, the filter element locking mechanism disclosed in U.S. Pat. No. 4,322,231 to Hilzendeger and Masuda includes such a support structure and locking bars.

In operation, to mount and secure the unitary filter element 18 in the filter apparatus 10, end cap 31 of filter element 18 is placed within opening 50 of the reusable mounting plate 20.

Next, tubular filter 22 is slidingly received within opening 50 and the mounting plate 20 is moved upwardly, as viewed in FIG. 2, relative to the unitary filter element 18. As best shown in FIGS. 4 and 5, the mounting plate 20 contacts and abuts ledge 32. Next, the mounting plate 20 is placed on the locking bars 54 and slid so that the central filter chamber 24 is in communication with an opening 16 on tube sheet 12. The process is repeated until each of the openings 16 in the tube sheet 12 has a respective filter element 18 disposed below it.

In the preferred embodiment, as shown in FIG. 3, a flange 52a of a mounting plate 20a may contact a flange 52b of an adjacent mounting plate 20b when placed on the locking bars 54. During this initial loading process, the support structure, specifically the locking bars 54, are in the first position at a distance away from tube sheet 12 (if used in a system with locking structure as disclosed in U.S. Pat. No. 4,322,231). When all of the filter cartridges 14 are in the appropriate position, the locking bars 54 are moved to the second position relatively closer to tube sheet 12. In this position, the gasket 38 engages the underside of tube sheet 12 to form a seal between the unitary filter element 18 and the tube sheet 12. Thus, when the filter apparatus 10 is in operation, the air within the dirty air plenum passes through tubular filter 22 and is forced upwardly through central filtering chamber 24 and ultimately opening 16 of the tube sheet 12 without escaping at the connection between the filter element 18 and the tube sheet 12.

After extensive use and cleaning through conventional techniques, the filter elements 18 eventually lose their effectiveness. When this occurs, a support structure (such as the mechanism taught by U.S. Pat. No. 4,322,231) may be manipulated so that the locking bars 54 are in their first position at a distance from the tube sheet 12 and the filter cartridges 14 may be slidingly removed. Once the cartridges 14 are removed from the filter apparatus 10, the mounting plates 20 are removed from the filter elements 18. After the filter elements 18 are discarded, new filter elements may be placed in the filter apparatus using the reusable mounting plates 20 as described above.

From the foregoing it will be seen that this invention is one well adapted to attain all the ends and objects hereinabove set forth, together with the other advantages which are obvious and which are inherent to the invention. It will be understood that certain features and subcombinations are of utility and may be employed without reference to other features and subcombinations. This is contemplated by and is within the scope of the claims. Since many possible embodiments may be made of the invention without departing from the scope thereof, it is understood that all matter herein set forth or shown in the accompanying drawings is to be interpreted as illustrative and not in a limiting sense.

What is claimed is:

1. A bottom load filter cartridge for vertical suspension in a filter apparatus beneath a tube sheet having upper and lower planar surfaces and having an opening therethrough, the filter cartridge comprising:

a tubular filter having opposite ends and an interior fluid passageway;

a mounting cap, formed from a potting compound, secured to one end of said tubular filter, said mounting cap having a flange with upper and lower surfaces and with a central opening therethrough communicating with said interior fluid passageway of said tubular filter; and a mounting plate having an opening sized for receipt of said tubular filter wherein said lower surface of said flange of said mounting cap overlies said mounting plate when said tubular filter is received within said opening, whereby said mounting cap is supported by said mounting plate to enable said upper surface of said flange to engage the lower surface of said tube sheet and said central opening of said flange to register with the opening through said tube sheet when the filter apparatus is in operation.

2. The filter cartridge of claim 1 wherein said mounting cap further comprises a gasket coupled with said upper surface of said flange, said gasket providing a fluid-tight connection with the tube sheet when the filter apparatus is in operation.

3. The filter cartridge of claim 2 wherein said gasket is located within an annular groove located on said upper surface of the flange of said mounting cap.

4. The filter cartridge of claim 2 wherein said gasket is formed of urethane.

5. The filter cartridge of claim 1 wherein said mounting cap is formed of a cast, molded or extruded polymer.

6. The filter cartridge of claim 5 wherein said mounting plate is formed of steel.

7. The filter cartridge of claim 1 further comprising an end cap secured to the opposite end of said tubular filter, said end cap having an annular ring and a second member disposed within the opening defined by said ring.

8. The filter cartridge of claim 7 wherein said end cap is formed of a polymer and said second member is formed of a metal.

9. The filter cartridge of claim 8 wherein said second member is dome-shaped.

10. A bottom load filter cartridge for vertical suspension in a filter apparatus having a tube sheet with upper and lower planer surfaces and with an opening therethrough and further having a locking mechanism to bias the filter cartridge to engagement with the lower surfaces of the tube sheet, the filter cartridge comprising:

a tubular filter having opposite ends and an interior fluid passageway;

a mounting cap, formed from a potting compound, secured to one end of said tubular filter, said mounting cap having a flange with upper and lower surfaces and with a central opening therethrough communicating with said interior fluid passageway of said tubular filter; and a mounting plate having an opening sized for receipt of said tubular filter wherein said lower surface of said flange of said mounting cap overlies said mounting plate when said tubular filter is received within said opening and wherein said mounting cap is supported by said mounting plate when the filter apparatus is in operation to enable said upper surface of said flange to engage the tube sheet when the locking mechanism moves said mounting plate in a direction towards the tube sheet.

11. The filter cartridge of claim 10 wherein said mounting cap further comprises a gasket coupled with said upper surface of said flange, said gasket providing a fluid-tight connection with the tube sheet when the filter apparatus is in operation.

12. The filter cartridge of claim 11 wherein said gasket is located within a channel located on said upper surface of said flange of the mounting cap.

13. The filter cartridge of claim 11 wherein said gasket is formed of urethane.

14. The filter cartridge of claim 1 wherein said mounting cap is formed of a cast, molded or extruded polymer.

15. The filter cartridge of claim 10 wherein said mounting plate includes a pair of opposing flanges upstanding wherein one of said pair of flanges may abut an adjacent filter cartridge when multiple filter cartridges are placed within the filter apparatus.

16. The filter cartridge of claim 10 further comprising an end cap, said end cap having an annular ring and a second member disposed within the opening defined by said ring.

17. The filter cartridge of claim 16 wherein said end cap is made of a polymer and said second member is made of metal.

18. The filter cartridge of claim 16 wherein said second member is dome-shaped.

* * * * *